United States Patent
Imfeld et al.

(10) Patent No.: US 10,753,214 B2
(45) Date of Patent: Aug. 25, 2020

(54) SEALING ARRANGEMENT ON COMBUSTOR TO TURBINE INTERFACE IN A GAS TURBINE

(71) Applicant: ANSALDO ENERGIA SWITZERLAND AG, Baden (CH)

(72) Inventors: Jost Imfeld, Scherz (CH); Hans-Christian Mathews, Zürich (CH); Urs Benz, Gipf-Oberfrick (CH)

(73) Assignee: ANSALDO ENERGIA SWITZERLAND AG, Baden (CH)

(*) Notice: Subject to any disclaimer, the term of this patent is extended or adjusted under 35 U.S.C. 154(b) by 399 days.

(21) Appl. No.: 15/649,938

(22) Filed: Jul. 14, 2017

(65) Prior Publication Data
US 2018/0016923 A1 Jan. 18, 2018

(30) Foreign Application Priority Data
Jul. 15, 2016 (EP) .................... 16179824

(51) Int. Cl.
| | | |
|---|---|---|
| *F01D 9/02* | (2006.01) | |
| *F01D 11/00* | (2006.01) | |
| *F16J 15/00* | (2006.01) | |
| *F01D 3/04* | (2006.01) | |
| *F01D 11/06* | (2006.01) | |
| *F23R 3/60* | (2006.01) | |

(Continued)

(52) U.S. Cl.
CPC .............. *F01D 9/023* (2013.01); *F01D 3/04* (2013.01); *F01D 11/001* (2013.01); *F01D 11/005* (2013.01); *F01D 11/06* (2013.01); *F16J 15/00* (2013.01); *F23R 3/60* (2013.01); *F02C 7/185* (2013.01); *F02C 7/20* (2013.01)

(58) Field of Classification Search
CPC .......... F01D 9/023; F01D 11/005; F02C 7/28; F05D 2240/59; F23R 2900/00012
See application file for complete search history.

(56) References Cited

U.S. PATENT DOCUMENTS

| | | |
|---|---|---|
| 4,379,560 A | 4/1983 | Bakken |
| 2005/0063816 A1* | 3/2005 | Jorgensen ............... F01D 9/023 415/110 |
| 2012/0306169 A1 | 12/2012 | Giri |

(Continued)

FOREIGN PATENT DOCUMENTS

| | | |
|---|---|---|
| EP | 2 530 251 A2 | 12/2012 |
| EP | 2 574 731 A2 | 4/2013 |
| EP | 2 930 312 A2 | 10/2015 |

OTHER PUBLICATIONS

Search Report dated Jan. 23, 2017, by the European Patent Office for Application No. 16179824.4.

*Primary Examiner* — Scott J Walthour
(74) *Attorney, Agent, or Firm* — Buchanan Ingersoll & Rooney PC (57) ABSTRACT

A gas turbine unit having a combustor having a liner, a turbine, arranged downstream of the liner along a main flow gas direction and including a plurality of first stage vanes, a rotor cover support located inwardly of the vanes, and a sealing arrangement at a combustor to turbine interface, wherein the sealing arrangement includes a first dogbone seal extending between the rotor cover support and an inner downstream end of the liner or between the rotor cover support and a bulkhead located at the inner downstream end of the liner.

15 Claims, 7 Drawing Sheets

(51) Int. Cl.
*F02C 7/18* (2006.01)
*F02C 7/20* (2006.01)

(56) References Cited

U.S. PATENT DOCUMENTS

2013/0084166 A1 4/2013 Klingels
2015/0102566 A1 4/2015 Hanumanthan et al.
2015/0354386 A1 12/2015 Chuong et al.

* cited by examiner

SEALING ARRANGEMENT ON COMBUSTOR TO TURBINE INTERFACE IN A GAS TURBINE

PRIORITY CLAIM

This application claims priority from European Patent Application No. 16179824.4 filed on Jul. 15, 2016, the disclosure of which is incorporated by reference.

FIELD OF THE INVENTION

The present invention relates to a gas turbine unit comprising at least a combustor and at least a turbine along a main flow gas direction.

In particular, the present invention relates to a sealing arrangement located between the combustor outlet and the turbine inlet.

More in particular, the present invention relates to a sealing arrangement located on the inner diameter of the combustor to turbine interface in a gas turbine.

Moreover, the present invention relates to a method for installing the above sealing arrangement.

DESCRIPTION OF PRIOR ART

In a gas turbine, seals are used for sealing between static components of a turbine respective at the interfaces of turbine components. For example, seals are used for sealing cooling-air paths, for sealing between the individual segments of a guide blade row or as a circumferential seal between a casing of the turbine and a guide blade row or for sealing component interfaces between the combustor and the turbine.

In particular, the circumferential pattern of the combustor outlet in combination with high vane movement is today a challenge for sealing solutions. Indeed, the rocking vane movement comprises high axial and radial movements and the sealing on combustor to turbine interface has to be guaranteed during all operating conditions.

According to the prior art, on combustor to turbine interface, in particular on the inner diameter between combustor outlet and the first turbine vane, the sealing arrangement consist in honeycomb seals.

Figure 1:
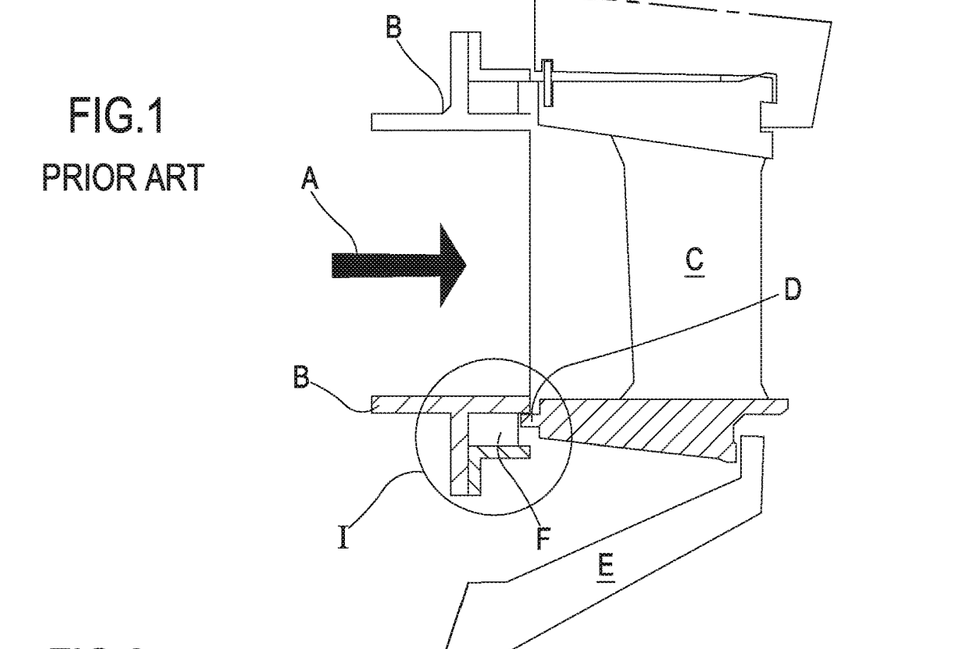
FIG. 1 is a schematic view of a combustor to turbine interface of a gas turbine according the prior art.

Reference is made to FIG. 1 that is a schematic view of a combustor to turbine interface of a gas turbine according to the prior art. In particular, FIG. 1 discloses a combustor to turbine interface wherein, following the main gas flow A, the gas turbine comprises a sequential liner B, a turbine vane C with vane teeth D, and a rotor cover support E. The sealing arrangement located on the inner diameter I of this combustor to turbine interface consists in a honeycomb seal F located facing the inner vane tooth D.

The above honeycomb sealing arrangement involves some possible risks as a full seal loss during operation or a seal delamination that can lead to high leakages.

SUMMARY OF THE INVENTION

Accordingly, an object of the present invention is to provide a sealing arrangement on combustor to turbine interface in a gas turbine, in particular on the inner diameter between the combustor outlet and the first turbine vane, that is safe, accurate, having a simple design and suitable to allow higher pressure at the first vane.

Therefore, an object of the invention is to seal the interface between the combustor and the first turbine vane in order to reduce the leakage to a minimum also in case of axial and radial interface movements.

In order to achieve the object mentioned above, the present invention provides a gas turbine unit comprising:
a combustor having a liner
a turbine, arranged downstream of the liner along a main flow gas direction and including a plurality of first stage vanes;
a rotor cover support, located inwardly of the vanes;
a sealing arrangement at the combustor to turbine interface. According to the invention the sealing arrangement comprises a first dogbone seal extending between the rotor cover support and an inner downstream end of the liner or between the rotor cover support and a bulkhead located at the inner downstream end of the liner.

In particular, the above first dogbone seal can be defined as a flat dogbone seal because it comprises straight edges, wherein a first edge is housed in a groove of the rotor cover support. In one embodiment, the combustor is a can combustor with a plurality of cans wherein each can to turbine interface is provided with the above sealing arrangement.

The liner can be a sequential liner.

The dogbone seals are today well used in gas turbines and consist in a middle piece that has respective edges in form of bulges on two opposite sides. The bulges are tightly arranged in grooves in the static components.

Advantageously, the flat dogbone seal arranged between the bulkhead and the rotor cover support reduces the leakage and, moreover, compensates the relative movements in axial direction of the combustor to turbine interface, for instance generated during a forced cooling operation.

In particular, according to the present invention the portion of the rotor cover support provided with the groove can be realized as an additional part to be integrated in an existing rotor cover support.

Advantageously, the sealing arrangement of the invention can be mounted in existing reworked rotor cover support.

In particular, according to an embodiment of the present invention the sealing arrangement comprises also a second dogbone seal extending between the rotor cover support and the inner vane platform, wherein the second dogbone seal comprises an edge curved shaped.

Advantageously, this curved dogbone seal reduces the leakage and, moreover, compensates the relative movements in radial direction of the combustor to turbine interface, for instance generated during a cold start operation.

In particular, according to the present invention at the inner diameter of the combustor to turbine interface the gas turbine can be provided with a honeycomb seal arranged on the bulkhead facing the inner platform vane tooth, wherein the honeycomb seal is brazed inclined.

Advantageously, the above brazed inclined honeycomb seal, that does not work as an actual seal, avoids the hot gas ingestion working together with the relevant vane tooth for realizing a labyrinth with a defined gap width.

In particular, according to the present invention the bulkhead and the combustor liner end can be configured to realize a near wall cooling passage.

Advantageously, the above near wall cooling passage avoids the hot gas ingestion.

In particular, according to the present invention the dogbone seals are arranged along 360° about the turbine axis in a segmented manner.

Advantageously, the segmented dogbone seals improve the ability to dis-assembly each single vane in case of a replacement reducing the operating cost.

In particular, according to the present invention the seal arrangement comprises side seals laterally connected to the dogbone seals.

Advantageously, the above side seals allow to close gaps dogbone to dogbone.

In particular, according to the present invention the gas turbine can be provided with a fixing plate mounted on the rotor cover support to keep in position curved dogbone inner edge.

Advantageously, the above fixing plate allows the edges of two adjacent curved dogbones to overlap each other.

In particular, according to the present invention the rotor cover support comprises a hole located inwardly the flat dogbone seal.

Advantageously, the above hole allows a cooling air supply to the plenum inwardly the vane.

It is to be understood that both the foregoing general description and the following detailed description are exemplary, and are intended to provide further explanation of the invention as claimed. Other advantages and features of the invention will be apparent from the following description, drawings and claims.

The features of the invention believed to be novel are set forth with particularity in the appended claims.

BRIEF DESCRIPTION OF DRAWINGS

Further benefits and advantages of the present invention will become apparent after a careful reading of the detailed description with appropriate reference to the accompanying drawings.

The invention itself, however, may be best understood by reference to the following detailed description of the invention, which describes some exemplary embodiments of the invention, taken in conjunction with the accompanying drawings, in which:

FIG. 9A to FIG. 9F are sectional schematic views of six different design variants of the embodiment of sealing arrangement of FIG. 3;

FIG. 10A to FIG. 10D are sectional schematic views of the method steps for installing the sealing arrangement according to the invention;

DETAILED DESCRIPTION OF THE INVENTION

In cooperation with the attached drawings, the technical contents and detailed description of the present invention are described thereinafter according to preferable embodiments, being not used to limit its executing scope. Any equivalent variation and modification made according to appended claims is all covered by the claims claimed by the present invention.

Reference will now be made to the drawings to describe the present invention in detail.

Reference is made to FIG. 1 which is a schematic view of a combustor to turbine interface of a gas turbine unit according the prior art.

The gas turbine unit comprises at least a combustor and at least a turbine along a main flow gas direction A. In particular, a combustor to turbine interface is defined by:

a combustor sequential liner B, a vane C with a vane tooth D facing the combustor sequential liner B, a rotor cover support E located between the rotor (not shown) and the vane C, and a sealing arrangement F;

According to this prior art embodiment, the sealing arrangement F is located at the inner diameter I of the combustor to turbine interface consists in an honeycomb seal F.

Figure 2:
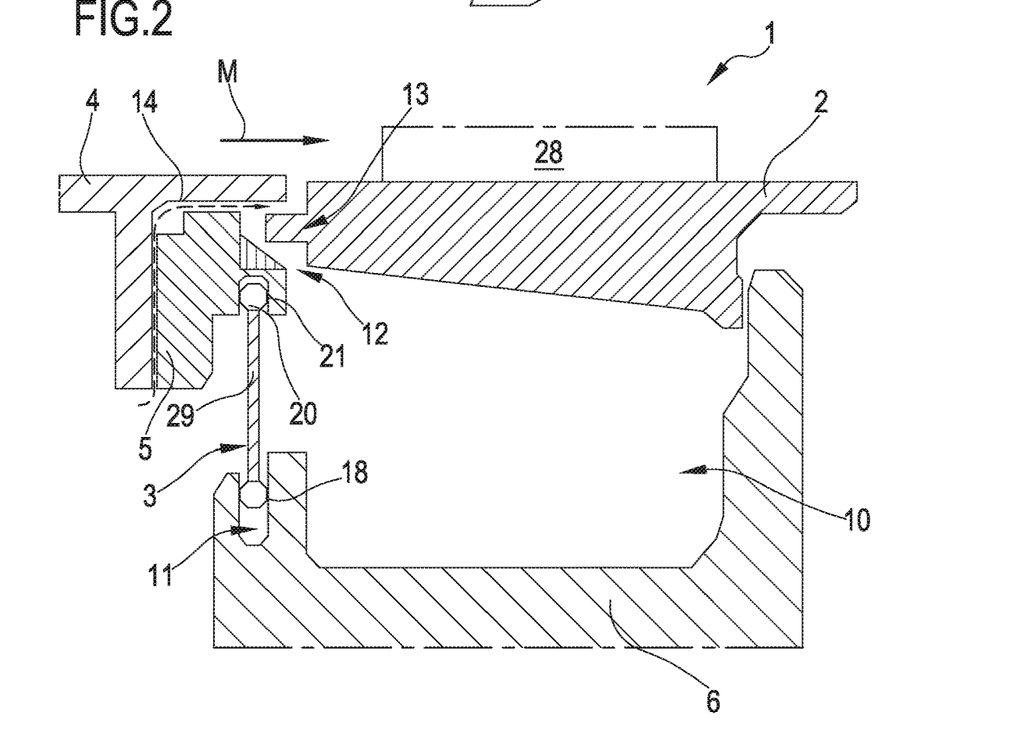
FIG. 2 is a schematic sectional view of a sealing arrangement of the combustor to turbine interface according to an embodiment of the invention.

Reference is now made to FIG. 2 that is a schematic sectional view of portion of a gas turbine unit. The gas turbine unit comprises a combustor, that may be a can combustor, a turbine and a sealing arrangement 1 according to a first embodiment of the invention at an interface between the combustor and the turbine (combustor to turbine interface 1). In particular, FIG. 2 shows an inner portion of a downstream end of a combustor liner 4 and a vane inner platform 2 of a stator vane 28 of a first turbine stage.

The vane inner platform may be a single ring along 360° about the turbine axis common to all vanes or each vane may be provided with relevant platform segment.

The main flow M defines the hot gas flow that flows from the combustor toward the first vane 28.

The expression "inner or inwardly" refer to elements or portions near to the gas turbine axis.

Facing the inner end of the sequential liner 4, the gas turbine is provided with the first turbine vane that in FIG. 2 is shown as only the inner portion 2.

Between the rotor and the vane inner platform 2, the gas turbine unit comprises a rotor cover support 6 configured to realize a plenum 10 between the vane 2 and the rotor cover support 6.

In particular, the plenum 10 is closed outwardly by the vane inner platform 2, inwardly and downstream by the rotor cover support 6 and upstream by a flat dogbone seal 3 extending from the front portion of the rotor cover support 6 to a bulkhead 5 arranged inwardly the sequential liner end 4.

The expressions "downstream" and "upstream" refer to the main flow M direction.

The flat dogbone seal 3 comprises a middle laminar thin portion 29 (which in the embodiment of FIG. 2 is perpendicular to rotor axis with a vertical development) and two opposite bulged edges 18 20 wherein the first inner edge 18 is coupled to the rotor support 6 and the second outer edge 20 is coupled to the bulkhead 5.

In particular, the first dogbone seal 3 is defined as a flat dogbone seal 3 because the edges 18 20 are straight.

The inner edge 18 of the flat dogbone seal 3, is arranged in a groove 11 in the rotor cover support 6 whereas the outer end 20 of the flat dogbone seal 3 is arranged in a groove 21 of the bulkhead 5.

In one embodiment, the gas turbine unit may not have the bulkhead 5 and the flat dogbone outer edge 20 may be sealable coupled directly to the sequential liner 4.

Figure 3:
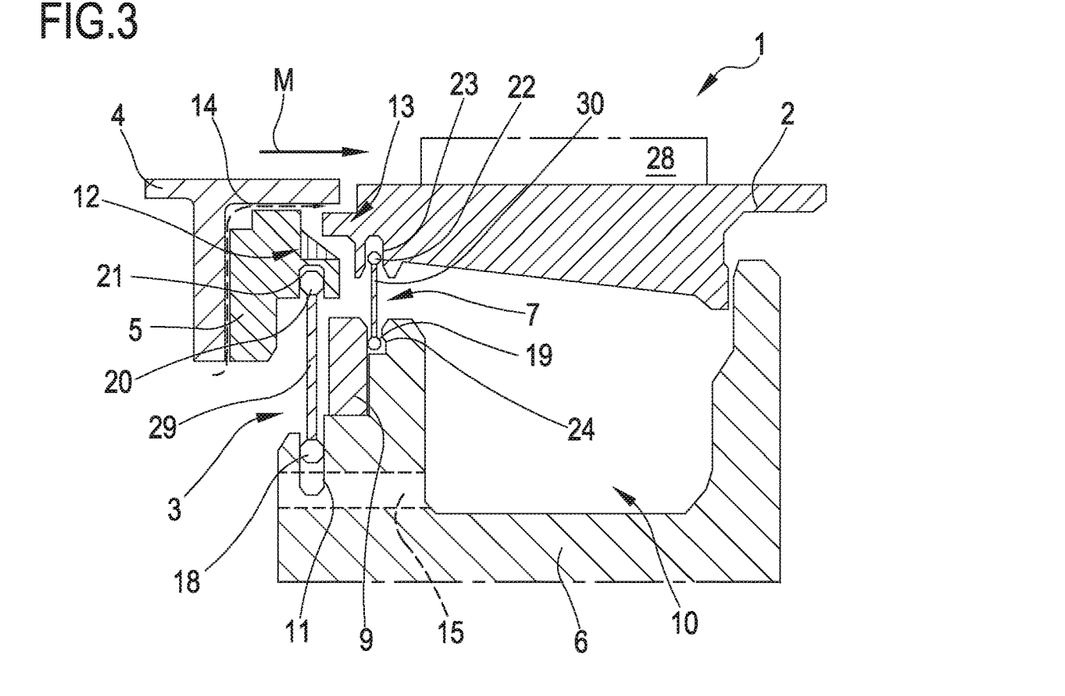
FIG. 3 is a schematic sectional view of a sealing arrangement of the combustor to turbine interface according to another embodiment of the invention.
Figure 4:
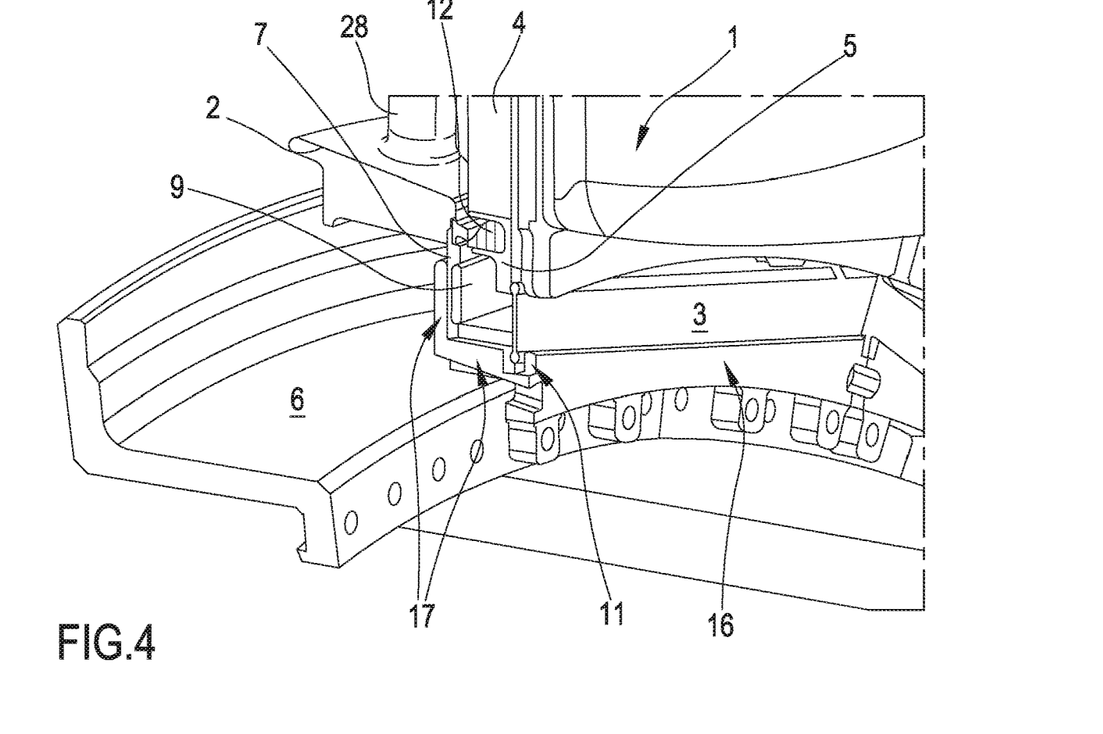
FIG. 4 is a partial perspective schematic view of the sealing arrangement of FIG. 3.

Reference is made to FIGS. 3 and 4 that are respectively a schematic sectional view and a partial perspective schematic view of a sealing arrangement according to a second embodiment of the invention.

The vane platform 2 comprises a vane tooth 13 facing a portion of the bulkhead 5 provided with a diagonal honeycomb seal 12. Between the vane tooth 13 and the diagonal honeycomb seal 12 a gap is present.

A wall cooling passage 14 is defined between the bulkhead 5 and the sequential liner end 4.

According to this second embodiment of the invention, the gas turbine interface 1 also comprises a second dogbone seal 7 extending between the rotor cover support 6 and the inner portion of the vane inner platform 2, in addition to the flat dogbone seal 3.

This second dogbone seal 7 comprises a middle thin laminar portion (which in the embodiment of FIG. 3 is perpendicular to rotor axis with a vertical development) and two opposite bulged edges 19 22. The first inner edge 19 is coupled to the rotor support 6 and the second outer edge 22 is coupled to the vane inner platform 2.

In particular, the second dogbone seal 7 is shape curved because at least the outer edge 22 is curved shaped about the turbine axis. This outer edge 22 is arranged in a groove 23 of the vane inner platform 2 facing the plenum 10.

A curved dogbone inner edge 19 is arranged at a step portion 24 of rotor cover support 6. This step portion 24 is closed upstream by a fixing plate 9.

The rotor cover support 6 comprises a hole 15 for fluidly connecting the plenum 10 with the volume upstream the seal arrangement inwardly the liner 4. In particular, the hole 15 is a horizontal hole arranged inwardly the flat dogbone seal 3 and passing the groove 11 where the inner edge 18 of the flat dogbone seal 3 is located.

The flat, or straight, and curved dogbones 3, 7 are segmented along the 360° around the gas turbine axis and FIG. 4 discloses side seals 17 laterally arranged to two adjacent sectors.

Figure 5:
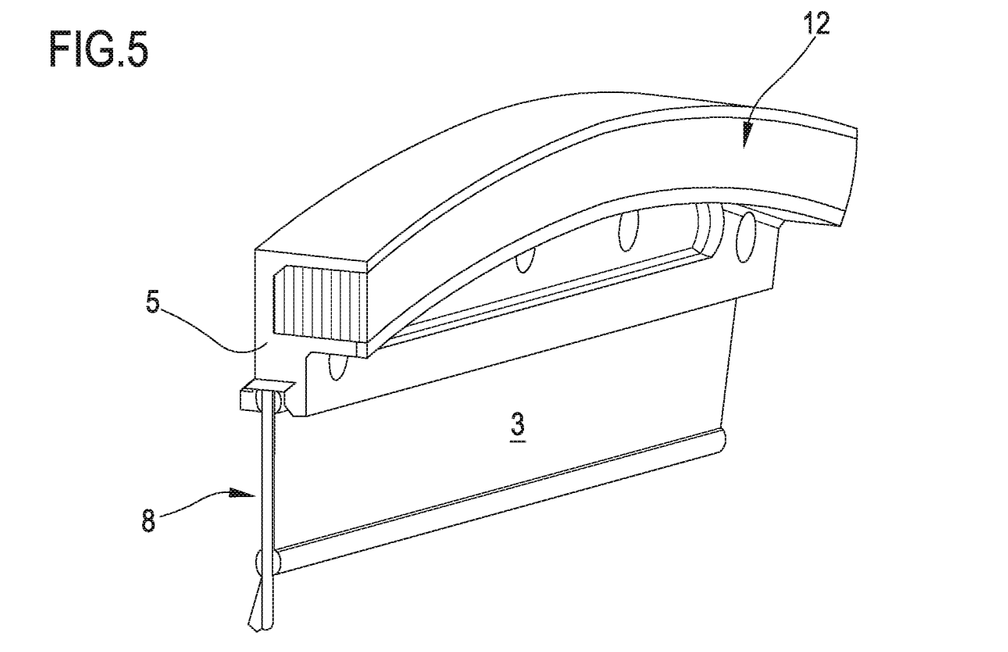
FIG. 5 is a perspective schematic view of some elements of the sealing arrangement according the invention.

Reference is made to FIG. 5 that is a perspective schematic view of some elements of the sealing arrangement according the invention.

In particular, FIG. 5 discloses the bulkhead 5, the relevant honeycomb seal 12, the flat dogbone seal 3, and a radial seal 8 connecting two adjacent flat dogbone seals 3.

Figure 6A:
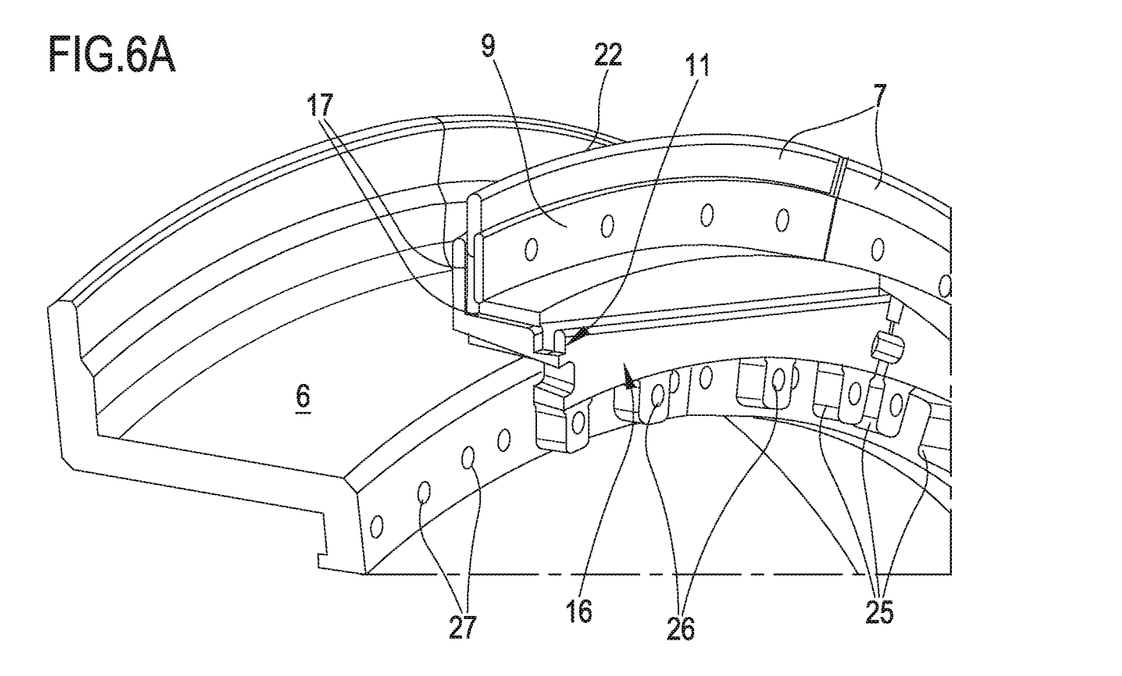
FIG. 6A is a partial perspective schematic view of some elements suitable for installing the sealing arrangement according to the invention in an existing turbine.
Figure 6B:
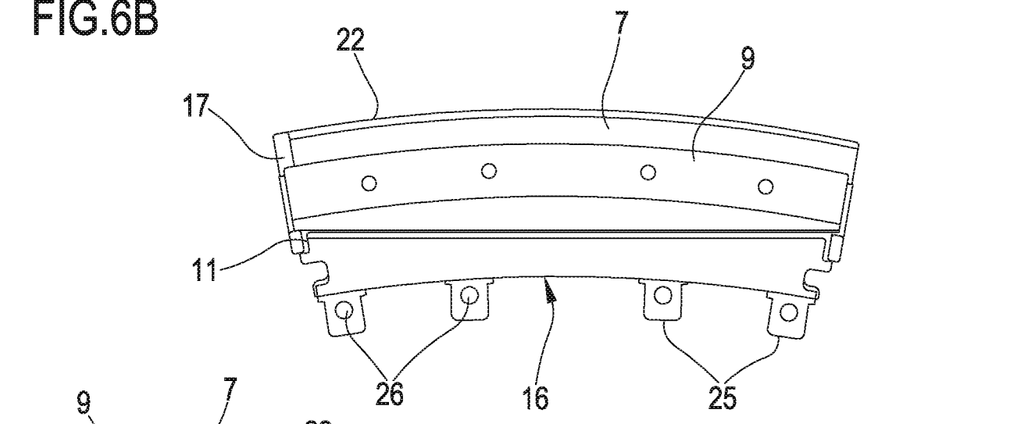
FIGS. 6B and 6C are respectively a front schematic view and a perspective schematic view of an element of the sealing arrangement of FIG. 6A suitable for installing the sealing arrangement in a current turbine.
Figure 6C:
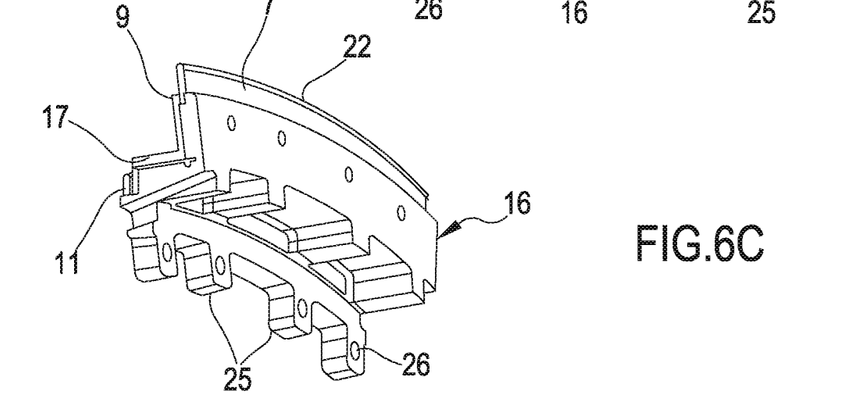

Reference is made to FIGS. 6A, 6B and 6C that are respectively a partial perspective schematic view, a front schematic view a perspective rear schematic view of an additional element suitable for installing the sealing arrangement according to the invention in an existing turbine.

As previously described, the inner edge 18 of the flat dogbone seal 3 is arranged in a groove 11 of the rotor cover support 6 and the inner edge 19 of the curved dogbone 7 is arranged on a step 24 of the rotor cover support 6.

Since the existing rotor cover support may not be originally provided with such above groove 11 and step 24, in one embodiment of the invention these portion can be provided in an additional part 16 which is fixed to the rotor cover support 6 during rework operations.

FIG. 6B discloses an upstream view of the additional part 16 provided with the curved dogbone 7 arranged in position by the fixing plate 9 and with relevant side seal 17.

The additional part 16 is inwardly provided with lobes 25 having holes 26 for matching with holes 27 provided in the rotor cover support 6.

Figure 7:
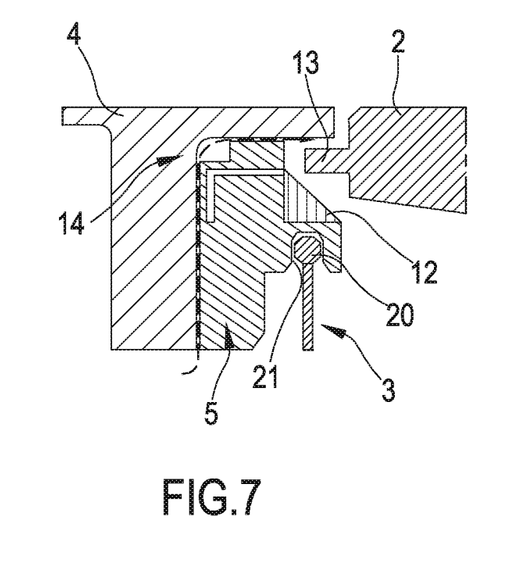
FIG. 7 and FIG. 8 are sectional schematic views of two embodiments of a element of the sealing arrangement according to the invention.
Figure 8:
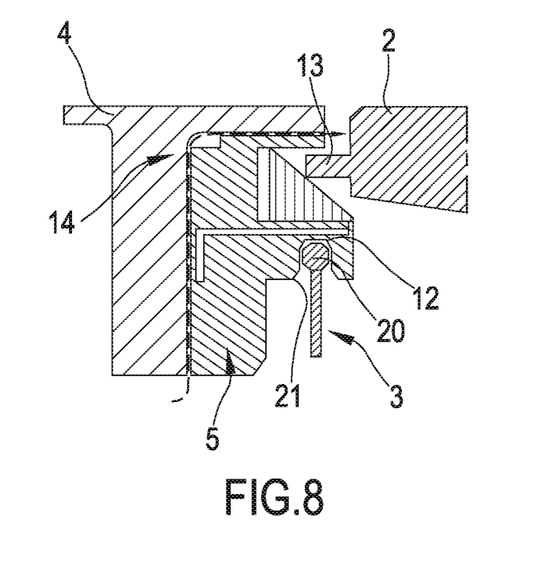

Reference is made to FIGS. 7 and 8 that are sectional schematic views of an element of the sealing arrangement according to different embodiments of the invention.

In particular, to FIGS. 7 and 8 show details of the bulkhead 5.

In FIG. 7, the outer portion of the bulkhead 5 ends upstream with the honeycomb seal 12 and the vane tooth 13 outwardly faces the liner 4.

In FIG. 8, the outer portion of the bulkhead 5 continues also at the honeycomb seal 12 and the vane tooth 13 is located between the honeycomb seal 12 and the bulkhead 5.

According the embodiment of FIG. 8, the wall cooling passage 14 extends up to the vane platform 2.

Reference is made to FIGS. 9A to 9F that are sectional schematic views of six different design variants of the embodiment of sealing arrangement of FIG. 3.

In the previous described figures, the flat dogbone 3 is reported having a vertical development with a first "inner" edge 18 and a second "outer" edge 20.

However, according the invention the flat dogbone 3 can extend between the rotor cover support 6 and the bulkhead 5 with different orientations.

Figure 9A:
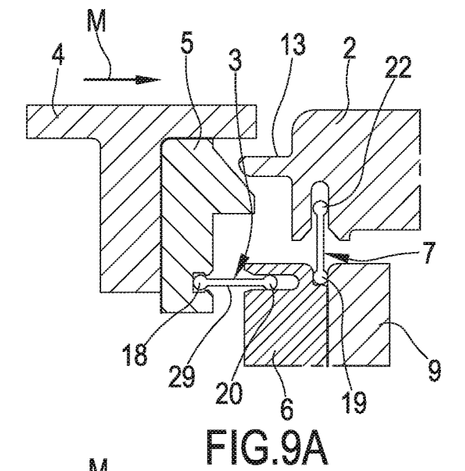

FIG. 9A discloses an embodiment wherein the flat dogbone 3 is horizontal (or parallel to the main flow M) and the first edge becomes an "upstream" edge 18 whereas the second edge becomes a "downstream" edge 20, In this embodiment the seal arrangement is not provided with the honeycomb seal 12.

Figure 9B:
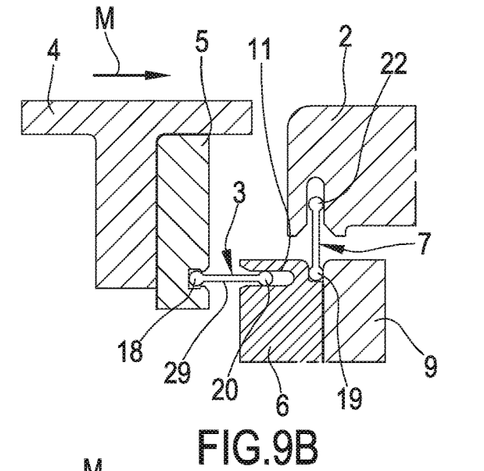

FIG. 9B discloses an embodiment similar to FIG. 9A wherein the vane platform 2 is not provided with the vane tooth 13.

Figure 9C:
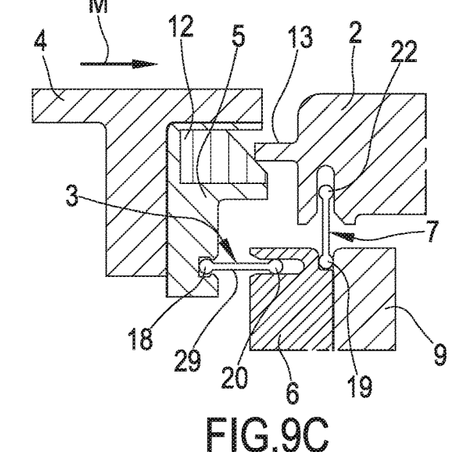

FIG. 9C discloses an embodiment similar to FIG. 9A wherein the seal arrangement is provided with the honeycomb seal 12.

Figure 9D:
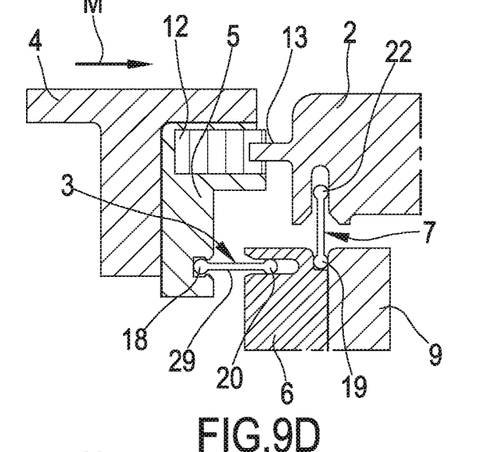

FIG. 9D discloses an embodiment similar to FIG. 9C wherein the vane tooth 13 penetrates at least in part the honeycomb seal 12.

Figure 9E:
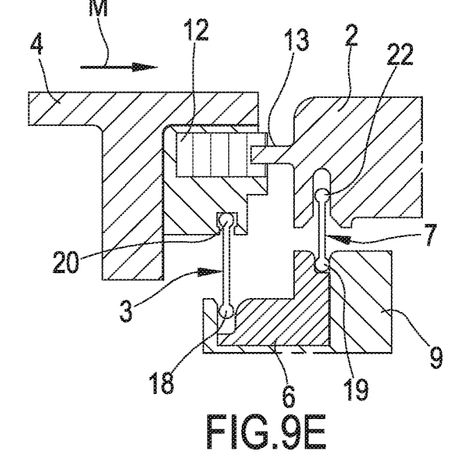

FIG. 9E discloses an embodiment similar to FIG. 9D wherein the flat dogbone 3 seal is vertical or orthogonal to the main flow M (as reported in FIG. 2) to define a inner 18 and an outer 20 edge.

Figure 9F:
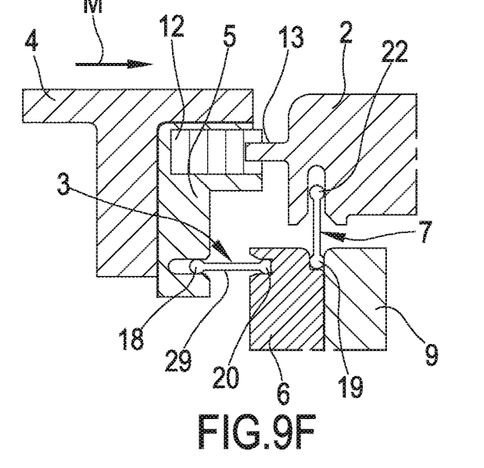

FIG. 9F discloses an embodiment similar to FIG. 9D wherein the flat dogbone seal 3 is vertical, or orthogonal to the main flow M. As disclosed in FIG. 9A-9F, and according the invention, side seals are foreseen in circumferential direction in order to reduce the leakage, which is state of the art.

Reference is made to FIGS. 10A to 10D which are sectional schematic views of the sealing arrangement according to the invention in subsequent steps of a method of installing.

Figure 10A:
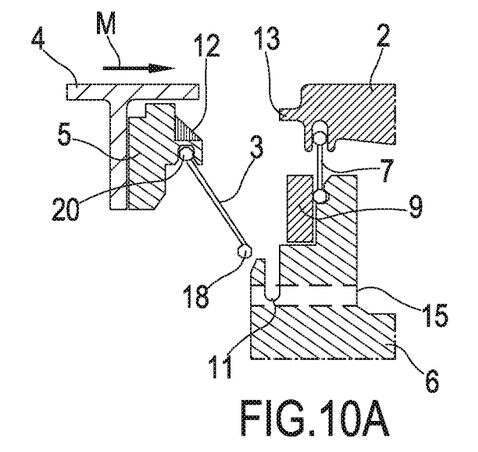

At the starting point of FIG. 10A, the liner 4 is separated from the vane 2. The curved dogbone 7 is kept in position by the fixing plate 9. The flat dogbone 3 has the outer edge 20 arranged in the relevant bulkhead groove 21 whereas the inner edge 18 is free outside the rotor cover support groove 11.

In this configuration, the flat dogbone 3 can be tilted to set the inner edge 18 in a suitable position for entering the rotor cover support groove 11.

Figure 10B:
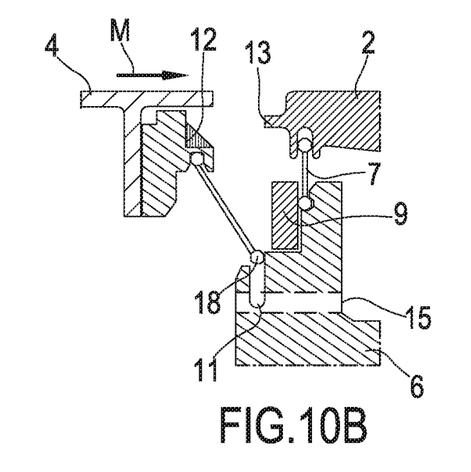
Figure 10C:
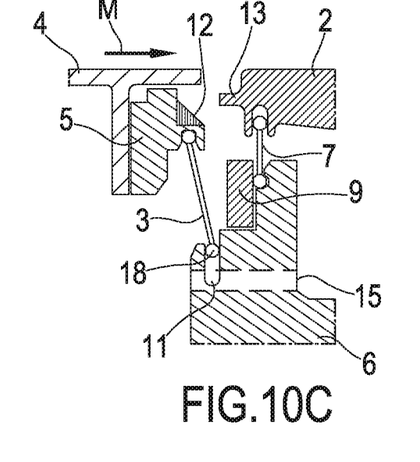

Once the inner edge 18 has engaged the cover rotor support groove 11, configuration disclosed in FIG. 10B, by an advancing movement of the liner 4 along the main flow M the flat dogbone inner edge 18 goes deeper in the support groove 11 whereas the flat dogbone 3 starts a tilting rotation towards a vertical disposition (see FIG. 10C).

Figure 10D:
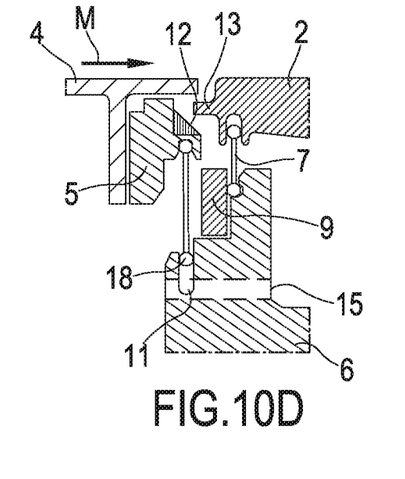

At the end of the advancing movement of the liner 4, when the vane tooth 13 is near to the honeycomb seal 12, the flat dogbone 3 is in the correct vertical position as disclosed in FIG. 10D.

Figure 11:
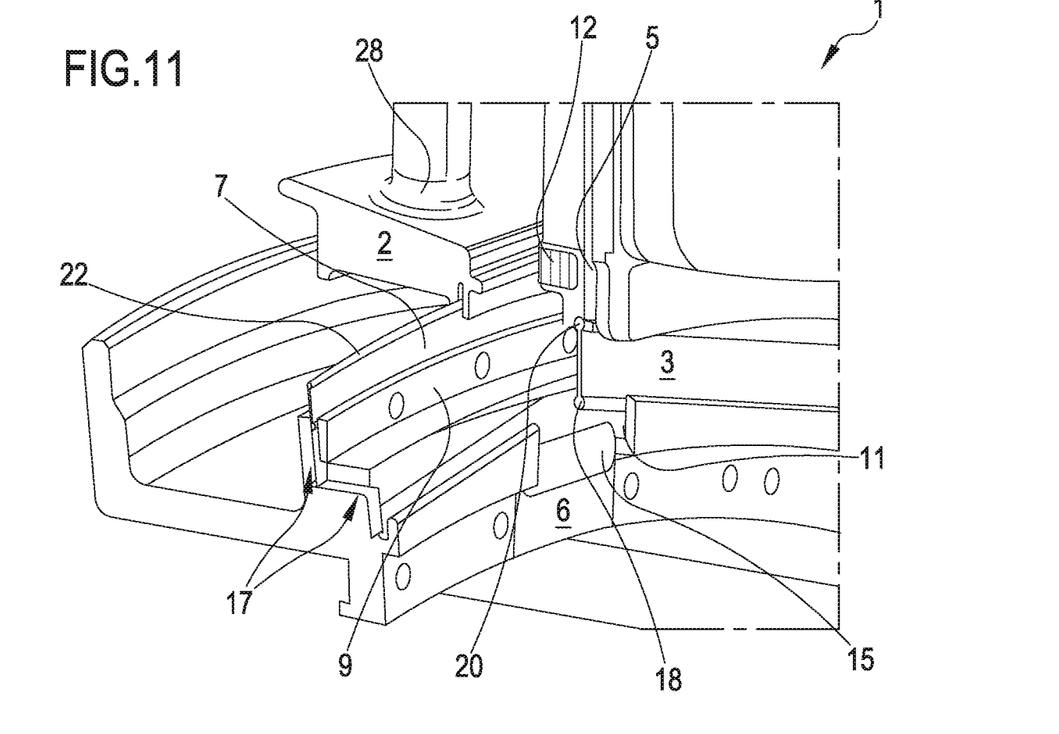
FIG. 11 is a schematic prospective view of a sealing arrangement according to another embodiment of the invention.

Reference is made to FIGS. 11A to 11C that are sectional schematic views of the sealing arrangement according to the invention and show movements thereof in three different operating conditions.

As previously described, the double dogbone arrangement according a embodiment of the invention allows to reduce the leakage and compensates both axial and radial movement of the interface during the operation condition.

Figure 12:
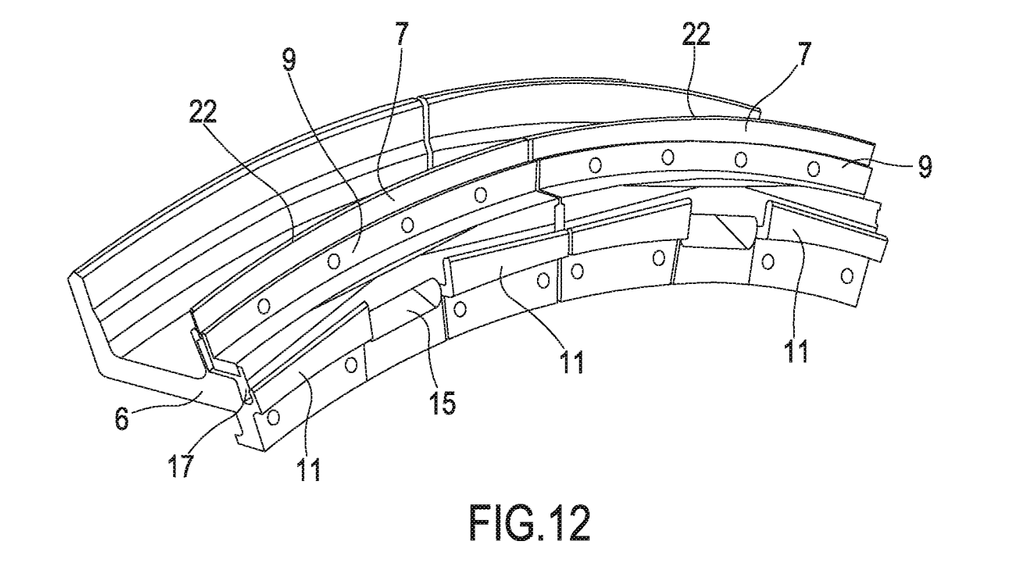
FIG. 12 is a schematic prospective view of an element of the sealing arrangement of FIG. 11.

Finally, reference is made to FIGS. 11 and 12 that are schematic prospective views of a sealing arrangement according to another embodiment of the invention.

As previously described, the rotor cover support portion having the groove 11 and the step 24 can be provided as an additional part 16 suitable to be fixed to an existing rotor cover support.

However, according the invention the gas turbine unit can be provided with a rotor cover support 6 having the above groove 11 and the step 24.

FIGS. 11 and 12 discloses an example of such modified rotor cover support 6 directly produced with the groove 11 and the step 24.

Although the invention has been explained in relation to its preferred embodiment(s) as mentioned above, it is to be understood that many other possible modifications and variations can be made without departing from the scope of the present invention. It is, therefore, contemplated that the appended claim or claims will cover such modifications and variations that fall within the true scope of the invention.

The invention claimed is:

1. A method of assembling a gas turbine unit, the gas turbine unit comprising a combustor having a liner, the gas turbine unit further comprising a turbine arranged downstream of the liner along a main flow gas direction, the turbine including a plurality of first stage vanes, a vane inner platform connected to a first stage vane of the plurality of first stage vanes, the vane inner platform comprising an inner platform vane tooth, the turbine further comprising a rotor cover support located inwardly of the plurality of first stage vanes, the gas turbine unit further comprising a sealing arrangement at a combustor-to-turbine interface, the inner platform vane tooth being arranged at an inner diameter of the combustor-to-turbine interface, the sealing arrangement including a first dogbone seal extending between the rotor cover support and a bulkhead located at an inner downstream end of the liner, wherein the inner platform vane tooth faces the bulkhead, the sealing arrangement further comprising a second dogbone seal extending between the rotor cover support and the vane inner platform, wherein the second dogbone seal extends perpendicularly to the first dogbone seal, the method comprising:
   a) providing on the rotor cover support a groove for receiving a first edge of the first dogbone seal;
   b) arranging in position the second dogbone seal between the rotor cover support and the inner platform vane by a fixing plate mounted on rotor cover support;
   c) arranging a second edge of the first dogbone seal in a groove in the bulkhead;
   d) arranging the first edge of the first dogbone seal in the groove of the rotor cover support; and
   e) moving an end of the liner towards the first stage vane for causing a rotation of the first dogbone seal towards a radially-oriented position.

2. The method as claimed in claim 1, wherein the step of providing the rotor cover support with a groove comprises:
   providing an additional part comprising the groove, the additional part being fixed to the rotor cover support.

3. A gas turbine unit comprising:
   a combustor having a liner;
   a turbine, arranged downstream of the liner along a main flow gas direction and including a plurality of first stage vanes;
   a vane inner platform connected to a first stage vane of the plurality of first stage vanes, the vane inner platform comprising an inner platform vane tooth;
   a rotor cover support located inwardly of the plurality of first stage vanes; and
   a sealing arrangement at a combustor-to-turbine interface, the inner platform vane tooth being arranged at an inner diameter of the combustor-to-turbine interface, the sealing arrangement including:
      a first dogbone seal extending between the rotor cover support and a bulkhead located at an inner downstream end of the liner, wherein the inner platform vane tooth faces the bulkhead; and
      a second dogbone seal extending between the rotor cover support and the vane inner platform, wherein the second dogbone seal extends perpendicularly to the first dogbone seal.

4. The gas turbine unit as claimed in claim 3, wherein the first dogbone seal comprises:
   a central laminar portion; and
   a first bulged edge and a second bulged edge, the first and second bulged edges being straight.

5. The gas turbine unit as claimed in claim 4, wherein the first dogbone seal is a flat dogbone seal and a first end of the flat dogbone seal is housed in a groove of the rotor cover support.

6. The gas turbine unit as claimed in claim 5, wherein a portion of the rotor cover support provided with the groove is configured as an additional part.

7. The gas turbine unit as claimed in claim 3, wherein the second dogbone seal comprises:
   a central laminar portion, a first bulged edge portion and a second bulged edge portion, wherein at least the second bulged edge portion is curved.

8. The gas turbine unit as claimed in claim 3, comprising:
   a honeycomb seal arranged on the bulkhead, the honeycomb seal facing the inner platform vane tooth.

9. The gas turbine unit as claimed in claim 8, wherein the honeycomb seal is a brazed and inclined seal.

10. The gas turbine unit as claimed in claim 3, wherein the bulkhead and the inner downstream end of the liner are configured to define a near wall cooling passage.

11. The gas turbine unit as claimed in claim 3, wherein the first dogbone seal is divided into a plurality of segments disposed along 360° about a turbine axis.

12. The gas turbine unit as claimed in claim 11, wherein the seal arrangement further comprises:
   side seals laterally connected to the first dogbone seal.

13. The gas turbine unit as claimed in claim 11, comprising:
   a fixing plate mounted on the rotor cover support to retain a position of a first end of each first dogbone seal segment, each first dogbone seal segment being curved.

14. The gas turbine as claimed in claim 3, wherein the rotor cover support comprises:
   a hole located radially inwardly from the first dogbone seal.

15. The gas turbine unit as claimed in claim 5, wherein the groove has a profile that matches a profile of a respective bulged edge of the first end of the flat dogbone seal.

\* \* \* \* \*